United States Patent Office 2,727,056
Patented Dec. 13, 1955

2,727,056

PROCESS FOR HYDROCARBON SYNTHESIS WITH A PRECIPITATED IRON CATALYST CONTAINING AN ALKALI OXIDE AND PRECIPITATED SILICIC ACID

Hans-Werner Gross and Paul Albert Christian Royen, Frankfurt (Main), Germany, assignors to Metallgesellschaft Aktiengesellschaft, Frankfurt, Germany, a corporation of Germany No Drawing. Application February 7, 1950, Serial No. 142,937

Claims priority, application Switzerland November 2, 1948

4 Claims. (Cl. 260—449.6)

The invention relates to a process for hydrocarbon synthesis.

The use of iron catalysts for hydrocarbon synthesis by hydrogenation of carbon monoxide is known and results in a chain of products comprising, besides hydrocarbons, particularly such oxygenated hydrocarbons as alcohols, fatty acids or the like. The amount of oxygenated products formed varied with the composition of the catalysts used and the conditions under which the reaction was carried out. Good results have been obtained with such iron catalysts which contained some percent of alkali oxide, particularly potassium oxide, and in which the alkali oxide had been incorporated in the form of alkali silicates. Such catalysts are characterized by the formation of a high percentage of paraffins, particularly when containing a high percentage of alkali. For feed gas water gas proved best suited as its ratio of carbon monoxide to hydrogen came closest to the ratio of consumption of these catalysts being about 1 carbon monoxide to 1.2 or 1.5 hydrogen with low alkali contents of the catalysts and about 1 to 1 or 0.8 and lower with higher percentages of alkali. The greater consumption of hydrogen however, was obtained only when the synthesis gas was recycled, i. e. when fresh synthesis gas plus a portion of the synthesis tail gas (the gas leaving the synthesis reactors) was fed to the reactors.

As even iron catalysts low in alkali formed considerable quantities of carbon dioxide there arose, with multistage operation, the disadvantage that carbon dioxide had to be removed from the synthesis gas between the single stages so as to secure a feed gas of suitable composition for each following stage.

It was now found that it is possible to increase considerably the consumption of hydrogen in proportion to carbon monoxide in the synthesis gas on hydrocarbon synthesis with iron catalysts containing alkali oxides and difficultly reducible fixed acids by applying an excess of reactive fixed acid over the simple ratio of weight of alkali oxide and acid anhydride. Suitably, this excess should be considerable, i. e. the ratio of weight of alkali oxide to acid anhydride should be between 1:1 and 1:7 and more. By difficultly reducible reactive fixed acids there are meant such acids anhyhrides, which will, under the conditions of synthesis and catalyst manufacture, not be reduced down to the chemical element which forms the acid anhydride, which will not evaporate under these conditions, and which, under the conditions of catalyst manufacture, are able to react with the alkali compounds simultaneously applied, particularly to form salts with these compounds.

According to this invention, f. i. the oxides of silicon, titanium, tungsten, molybdenum, vanadium, chromium, boron, phosphorus or the like oxygen-containing compounds, which are similarly difficult to reduce, which will not evaporate under the influence of the synthesis temperatures and which react with alkali compounds during the manufacture of the catalyst, may be used. In order to further define the reactivity by way of example, it may be stated that f. i. silicic acid should advantageously not be employed in precipitated catalysts as quartz or kieselguhr but as precipitated silicic acid or in the form of sol. It is, however, also possible to transfer the silicic acid during the preparation of the catalyst into a reactive form, f. i. by aid of alkali or to incorporate the silicic acid partly or wholly in form of alkali silicates in the catalyst. Similarly, also the other reactive fixed acids which will be used according to this invention will be incorporated in the catalysts either in a finely divided reactive form or in another form such as f. i. as pulverulent minerals, which will then be converted into a reactive form during the preparation of the catalyst.

If for the process covered by the invention catalysts are used which are obtained via fusion at high temperatures the acids may be applied in any form, advantageously finely divided. In this case the fusion treatment effects the transfer of the acids into a reactive form even if they had been added in another form. As alkali compounds particularly oxygen containing compounds of alkali metals such as carbonates, formates, nitrates, hydroxides or the like may be used. Potassium compounds are preferable. For the rest, the catalysts may contain any additives common with iron catalysts composition, e. g. copper or any other chemicals known to improve the efficiency of catalysts: zinc oxide, calcium oxide, aluminium oxide, and other oxides of metals of the alkaline earth group or thorium dioxide or the like. Also mixtures of such chemicals may be used. Equally, the catalyst may be used in mixture with carriers such as kieselguhr, or the like.

In many cases it is advantageous that two or more reactive fixed acids be present in the catalyst, e. g. silicic acid and tungsten acid or silicic acid and titanic acid.

Furthermore, it was found that the efficiency of these catalysts depends on the pressure under which the synthesis is carried out; the hydrogen consumption grows with increasing pressure. For example, a feed gas of given composition i. e. a carbon monoxide to hydrogen ratio of 1:1.2, may be reacted over a catalyst of the composition:

Total Fe _____ 100
Cu _____ 25
ZnO _____ 18
$K_2O$ _____ 45
$SiO_2$ _____ 45 at 10 atmospheres gauge and under recycling of tail gas. The carbon monoxide to hydrogen consumption may then be 1 CO:1.4 $H_2$. Increasing the pressure to 20 atm. will raise the ratio in which the two gases are worked up to about 1 CO and 1.7 $H_2$. On the other hand, increasing the alkali oxide content of above catalyst so that the $K_2O:SiO_2$ ratio will be 14–17 $K_2O$:45 $SiO_2$ will again change the ratio in which CO and $H_2$ are consumed to 1:1.3 or 1.4, given the same feed gas composition and the same pressure. The higher $K_2O$ content moreover results in a higher yield of paraffins.

If instead of the water gas there is used a gas of a CO to $H_2$ ratio of 1:1.8 or 2.0 such as is commonly fed to cobalt catalysts, the ratio of consumption rises towards higher consumption of hydrogen and practically no carbon dioxide will be formed. This is true particularly when setting the $K_2O$ to $SiO_2$ ratio to 1:6 or 1:7. The invention thus also offers the possibility of processing over iron catalysts such fresh feed gases as are used for the synthesis using cobalt-catalysts. In addition, with multistage operation, the carbon dioxide removal from the feed gases can be discarded for the subsequent stages.

A further advantage this invention offers is that it facilitates the operation of synthesis plants combining stages where the reactors are filled with cobalt catalysts with those having iron catalysts filled reactors, because the formation of carbon dioxide on the iron catalysts can be kept so low that it need no longer be considered.

These numerous possibilities to vary the operating conditions provide the invention with a good adaptability to conditions as given at the various plants.

Furthermore, it was found that the advantages of the new process depend to a certain degree on the ratio of e. g. $K_2O$ to $SiO_2$ rather than on the actual content of the catalyst of alkali oxide and acid, e. g. potassium oxide and silicic acid. Hence, already 2–3 parts of $K_2O$ and 6–15 parts of $SiO_2$ will suffice, when added to 100 parts iron which is present as metal and in the form of chemical compounds (total iron), to maintain ratios of consumption of CO to $H_2$ from 1:1.2 to 1.7 and higher depending on the pressure and the temperature under which the synthesis is carried out. It is startling to notice that also the paraffin yield does not decrease considerably with these relatively low alkali contents.

The ratio of consumption is influenced not only by the ratio of alkali oxide to fixed reactive acid, the $CO-H_2$ ratio of the feed gas and the pressure but is also determined by the way and the degree of reduction to which the catalyst is subjected previous to use in the synthesis.

The catalyst has been found to form the more $CO_2$, the more free iron it contains. If for example a catalyst of a composition as cited formerly in column 2, lines 44–48, is so much reduced with hydrogen that about 16% of the total iron are present as free metal, water gas in a recycle operation will be worked up at a ratio of 1 CO:1.4 to 1.5 $H_2$. Reduction, previous to use in the reactor, to 27% free iron causes the ratio of consumption to drop to 1 CO:1.1 to 1.2 $H_2$.

Preparation of catalysts used according to the invention may be carried out in a conventional manner. It has been stated previously that the process according to this invention may be carried out with such catalysts as are obtained by precipitation from solutions as well as with those which are obtained by fusing together or sintering the components, which in the case of fusing or sintering may be applied in the form of metals or oxides or metals and oxides.

When using metallic iron, f. i. iron powder, for the preparation of the catalysts, the mixture of iron with the other constituents of the catalyst may be heated to a high temperature, f. i. by means of an oxyhydrogen blow-pipe, f. i. up to white heat, and subsequently be completely smelted down by means of oxygen or oxygen-enriched air, the iron being oxidised. In place of the metal oxides also other oxydic compounds such as carbonates, nitrates, oxalates, formates, acetates, tartrates, phosphates and the like may be used.

The process covered by this invention may be adjusted to either high yields of paraffin or high yields of gasoline and diesel oils. For instance at increasing reaction temperature in general reaction products with lower boiling points are obtained.

Examples (1) Preparation of a precipitated catalyst containing silicic acid: 12 kg. of calcined soda are dissolved in water to yield 100 liter solution and are brought to boiling. To this solution there is slowly added under vigorous stirring a solution of the nitrates of iron, copper and zinc in the ratio of the metals of 100:25:14. In this solution, the concentration of the iron is to amount 3.31 kg. of the metal to 100 liters of solution. The solution is kept boiling till the freed carbon dioxide is removed, and is then filtered. Precipitation is carried out at a final pH of 6.8 to 7.0. To remove the sodium nitrate formed during the precipitation of filter cake is thoroughly washed with hot water. The wash water at last is sucked off. The filter cake is then impregnated with potassium nitrate solution and silicic acid and is kneaded. Potassium carbonate solution may be used alternatively.

The concentration of the potassium nitrate solution is so calculated that the desired ratio of $K_2O$ to $SiO_2$ will be met. The silicic acid may be applied either in the form of kieselgel, of precipitated silicic acid or alkali silicate e. g. waterglass, preferably potassium waterglass or mixtures of alkali silicate with kieselgel or precipitated silicic acid. The kneaded mass is formed in the usual manner and dried up at 110° C. in an air flow. The various measures applied in the preparation of catalysts are as such known. The catalyst mass is reduced in the conventional manner with hydrogen (500–1000 l. $H_2$ measured at normal temperature and normal pressure per hour and liter of catalyst) at about 320° C. during a period of 40 to 50 minutes. After this preliminary reduction the catalyst had a content of free iron of about 20% of the total iron.

Composition of the catalyst:
   100 parts by weight Fe
   25 parts by weight Cu
   18 parts by weight ZnO
   11 parts by weight $K_2O$
   45 parts by weight $SiO_2$ The synthesis was carried out at 10 atm. gauge; a gas recycle of 1:2.57; 230° C. and a load of 3.72 cu. ft. water gas (60° F., 30″ dry) per hour and liter of catalyst.

|  | Feed gas | Tail gas |
|---|---|---|
| $CO_2$ percent | 4.9 | 21.6 |
| $C_nH_m$ do | ---------- | 0.4 |
| $O_2$ do | 0.1 | 0.1 |
| CO do | 41.0 | 35.1 |
| $H_2$ do | 48.8 | 30.1 |
| $CH_4$ do | 0.3 | 2.4 |
| $N_2$ do | 4.9 | 10.3 |
| Number of C-atoms | 1.00 | 1.20 |

$CO+H_2$-conversion, 65.4%.
Ratio of consumption, 1CO:1.42$H_2$.
Paraffin content (B. P. higher than 320° C.) in percent by weight of the liquid products, 66%.

Thus it was possible by means of this catalyst to consume CO and $H_2$ at a ratio of 1:1.42, the feed gas containing CO and $H_2$ in a ratio of 1:1.2.

(2) The synthesis was carried out under the same conditions as outlined under (1), but at 20 atm. and 220° C.

|  | Feed gas | Tail gas |
|---|---|---|
| $CO_2$ percent | 5.2 | 18.9 |
| $C_nH_m$ do | ---------- | 0.5 |
| $O_2$ do | 0.1 | 0.1 |
| CO do | 41.2 | 43.4 |
| $H_2$ do | 49.8 | 27.4 |
| $CH_4$ do | 0.3 | 2.3 |
| $N_2$ do | 3.2 | 7.4 |
| Number of C-atoms | 1.00 | 1.21 |

$CO+H_2$-conversion, 66.3%.
Ratio of consumption, 1CO:1.69 $H_2$.
Paraffin content, 70.9%.

In this case the consumption ratio, due to an increase of the working pressure from 10 to 20 atm. gauge rises to 1CO:1.69$H_2$, in using a feed gas of about the same composition as according to Example 1.

(3) The composition of the here used catalyst was 100 total Fe; 25 Cu; 18 ZnO; 8.5 $K_2O$; and 40 $SiO_2$. Conditions of the synthesis were: 10 atm. pressure gauge; 225° C.; gas recycle of 1:2.9; load 3.908 cu. ft. water gas (60° F., 30″ dry) per hour and liter catalyst.

Preliminary reduction of the catalyst: 26.8% free Fe.

|  | Feed gas | Tail gas |
|---|---|---|
| $CO_2$ percent | 7.2 | 31.0 |
| $C_nH_m$ do | | 0.8 |
| $O_2$ do | 0.1 | 0.1 |
| CO do | 37.4 | 19.1 |
| $H_2$ do | 47.2 | 28.5 |
| $CH_4$ do | 0.1 | 5.1 |
| $N_2$ do | 8.0 | 15.4 |
| Number of C-atoms | 1.00 | 1.07 |

$CO+H_2$-conversion, 70.8%.
Ratio of consumption, $1CO:1.18H_2$.
Paraffin content, 58%.

(4) The method of operation was as under (3); the gas recycle, however, was 1:2.4 (i. e. 1 volume of fresh feed gas to 2.4 volumes of recycled gas).

Preliminary reduction of the catalyst resulted in a content of 15.6% free Fe of the catalyst.

|  | Feed gas | Tail gas |
|---|---|---|
| $CO_2$ percent | 6.5 | 26.3 |
| $C_nH_m$ do | | 0.7 |
| $O_2$ do | | 0.1 |
| CO do | 37.0 | 27.6 |
| $H_2$ do | 50.9 | 29.4 |
| $CH_4$ do | 0.2 | 3.9 |
| $N_2$ do | 5.4 | 12.0 |
| Number of C-atoms | 1.00 | 1.09 |

$CO+H_2$-conversion, 70.7%.
Ratio of consumption, $1CO:1.52H_2$.
Paraffin content, 61.5%.

Examples 3 and 4 show the influence which the degree of catalyst reduction bears upon the ratio of consumption. Hydrogen consumption in proportion to carbon monoxide consumption decreases with an increasing degree of catalyst reduction.

(5) The synthesis was aimed at preferred formation of light hydrocarbons. The catalyst composition equaled that given under (1), but there were only 7.5 parts of $K_2O$ to 100 parts of iron. Reduction was carried to 55% free iron related to total iron. Operating pressure was 20 atm., gas recycle was 1:2.93 at 295° C.; the load was 14.52 cu. ft. of water gas (60° F. and 30" dry) per hour and liter of catalyst.

|  | Feed gas | Tail gas |
|---|---|---|
| $CO_2$ percent | 6.3 | 47.1 |
| $C_nH_m$ do | | 0.3 |
| $O_2$ do | | 0.1 |
| CO do | 39.1 | 9.9 |
| $H_2$ do | 48.4 | 16.7 |
| $CH_4$ do | | 9.2 |
| $N_2$ do | 6.0 | 16.7 |
| Number of C-atoms | 1.00 | 1.17 |

$CO+H_2$-conversion, 89.1%.
Ratio of consumption, $1CO:1.19H_2$.
Paraffin content, 9.5%.

In spite of the high $CO+H_2$ consumption the high load of the catalyst and the high reaction temperature CO and $H_2$ were consumed in nearly the same ratio in which these gases are contained in the feed gas.

(6) A catalyst containing phosphoric acid and having the following composition:

100 parts Fe
5 parts Cu
3 parts $K_2O$
7.5 parts $P_2O_5$ is used. For preparing this catalyst, a boiling solution of 24 kg. $Fe(NO_3)_3.9H_2O+0.630$ kg. $Cu(NO_3)_2.3H_2O$, dissolved in 100 l. boiling water, is vigorously stirred into f. i. a boiling solution of 10.3 kg. KOH dissolved in 100 l. water. The deposit is filtered off and washed with a large quantity of hot water, until it is free of alkali. The paste is kneaded with a solution of 0.290 kg. $KH_2PO_4$ and 0.185 kg. $(NH_4)_2HPO_4$, dissolved in 3 l. hot water. The mass is dried and formed as usual.

The catalyst reduced with hydrogen to a metallic iron content of about 20%, consumes in the right manner a water gas of the composition $1CO:1.15H_2$, i. e. the consumption ratio of CO and $H_2$ corresponds to the ratio existing between these gases in the fresh synthesis gas; thesis gas and the recycled exit gas is between 1:2.0 to 1:3.0, the latter value applying to a higher consumption of about 65–75%, the former to a consumption of about 55–65% of $CO+H_2$.

(7) A molten catalyst of the composition 100 parts Fe
1 part Cu
0.5 part $K_2O$
1.5 parts $SiO_2$ or $B_2O_3$ is used. A mixture of 100 kg. iron powder, 1 kg. copper powder, 1.07 kg. potassium nitrate and 1.5 kg. $SiO_2$ (very finely ground quartz or precipitated silicic acid) is put into an iron receptacle, locally ignited by means of an oxyhydrogen blow pipe and melted in a current of oxygen. The quantity of silicic acid may be increased up to 3.5 kg. and above. The congealed melt is mechanically crushed into grain-sizes of about 2–4 mm. After being reduced with hydrogen, the mixture is used for the synthesis. If desired, the greater part of the alkali and the silicic acid may be substituted by addition of corresponding quantities of potassium tetraborate ($K_2B_4O_7.5H_2O$), silicic acid to be added to such an extent as to set the ratio between $K_2O$ and $SiO_2+B_2O_3$ at about 1:3 to 1:7 or less. The catalyst is reduced to a metallic iron content of at least 30%, preferably of 80–90% at a high hydrogen rate (at least 3000 l. hydrogen per liter catalyst an hour) and at a temperature of 400–450°. It will consume a synthesis gas with a carbon oxide/hydrogen ratio of $1CO:0.95H_2$ on this same ratio, provided that the fresh synthesis gas and exit gas retransferred to the synthesis are in a ratio of 1:3 to 1:4.

(8) In this case a sintered catalyst of the same composition as according to Example 7 is used. The mixture of pulverized constituents prepared according to Example 7 is formed into a paste by adding 12.5 l. water and dried about 6 minutes at 200° in an air flow. The dried mass is cut into small cubes of about 3–5 mm. In a flowing mix of 1 part air and 4 parts nitrogen the cubes are slowly heated up to about 800° C. Subsequently the mass may, if necessary, be crushed again into the desired grain size. The reduction is also in this case effected with hydrogen. The catalyst reduced according to Example 7 will, under the same test conditions, show nearly the same results as the catalyst according to Example 7.

(9) The catalyst containing silicic acid and titanic oxide consists of:

100 parts Fe
3 parts Cu
15.1 parts $K_2O$
19.2 parts $Na_2O$
72.6 parts $SiO_2$
24.4 parts $TiO_2$ The catalyst contains also CaO, $Al_2O_3$.

The initial mass is a humid Lauta mass with e. g. 52.8 percent by weight of dry substance, having the following composition:

|  | Percent |
|---|---|
| $Fe_2O_3$ | 46.2 |
| $Al_2O_3$ | 12.8 |
| CaO-MgO | 18.5 |
| $Na_2O$ | 6.2 |
| $SiO_2$ | 7.4 |
| $TiO_2$ | 7.9 |
| $SO_3$ | 0.9 |

105.0 kg. Lauta mass (humid) are formed into a paste by adding 20 l. water and, together with a solution of copper acetate (1.53 kg. Cu(CH₃.COO)₂.1H₂O), stirred into about 15 l. of hot water. 37.5 kg. technical potash water glass solution containing 2.7 kg. $K_2O$ and 8.90 kg. $SiO_2$ are then stirred into the mixture. Subsequently 1.5 kg. (NH₄)₂CO₃.1H₂O, dissolved in 10 l. hot water, are kneaded together with the above mixture, which is then drained in a centrifuge or filter press and formed and dried in the usual manner.

The catalyst is reduced with hydrogen (voluminal rate 1:1000) at 300° to a metallic iron content of 2 to 3%. It will use up water gas of a ratio of 1CO:1.15H₂ on the same ratio, provided that the synthesis gas and the recycled residual gas are in the ratio of 1:2.5 to 1:3.0.

What we claim is:

1. A precipitated iron carbon monoxide hydrogenation catalyst containing alkali oxide and 1–7 parts by weight of precipitated silicic acid for each part by weight of said alkali oxide.

2. A catalyst according to claim 1, in which said alkali oxide is $K_2O$.

3. In the method for the production of hydrocarbons and hydrocarbon derivatives by catalytic carbon monoxide hydrogenation, using precipitated iron catalysts containing an alkali oxide and precipitated silicic acid, the improvement which comprises using a hydrogen-rich carbon monoxide hydrogen-containing synthesis gas, adjusting the ratio by weight of alkali oxide to precipitated silicic acid of the catalyst within the range of 1:1 to 1:7 for the substantially proportional utilization of the carbon monoxide and hydrogen in the synthesis gas, a higher ratio of precipitated silicic acid to alkali oxide being used within said range for a higher proportional utilization of hydrogen, and thereafter contacting the synthesis gas and the catalyst.

4. Improvement according to claim 3, in which said contacting is effected under increased pressure.

References Cited in the file of this patent

UNITED STATES PATENTS

| | | |
|---|---|---|
| 1,801,382 | Wietzel | Apr. 21, 1931 |
| 2,183,146 | Michael | Dec. 12, 1939 |
| 2,254,806 | Michael | Sept. 2, 1941 |
| 2,318,626 | Pier | May 11, 1943 |
| 2,488,530 | Friedman et al. | Nov. 22, 1949 |
| 2,553,433 | Vesterdal | May 15, 1951 |
| 2,564,696 | Keith et al. | Aug. 21, 1951 |
| 2,564,958 | Clark | Aug. 21, 1951 |
| 2,647,138 | Rottig | July 28, 1953 |
| 2,683,726 | McGrath et al. | July 13, 1954 |

OTHER REFERENCES

Murata et al.: "This Synthesis of Gasoline from Carbon Monoxide and Hydrogen," LXI, 45, Jour. Soc. Chem. Ind., Japan (1942), pages 1271–1286; Chem. Abs., vol. 43, 1949, page 2400.

Golumbic: "Some Chemicals From Synthetic Liquid Fuels Processes," Bureau of Mines Report (R. I. 4467), June 24, 1949, pages 15 to 17.